(12) United States Patent
Burkatovsky

(10) Patent No.: US 7,277,763 B2
(45) Date of Patent: *Oct. 2, 2007

(54) CONFIGURABLE CONTROLLER

(75) Inventor: Vitaly Burkatovsky, Rishon Le-Zion (IL)

(73) Assignee: Kodak IL, Ltd., Herzlia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/478,468

(22) Filed: Jun. 29, 2006

(65) Prior Publication Data

US 2006/0241794 A1   Oct. 26, 2006

Related U.S. Application Data

(63) Continuation of application No. 10/667,640, filed on Sep. 22, 2003, now Pat. No. 7,096,073.

(51) Int. Cl.
  G05B 19/18 (2006.01)
  G05B 13/02 (2006.01)
(52) U.S. Cl. .............................. 700/7; 700/53; 700/28
(58) Field of Classification Search .................... 700/7, 700/53, 39, 27, 28, 87
See application file for complete search history.

(56) References Cited

U.S. PATENT DOCUMENTS

| | | | |
|---|---|---|---|
| 5,014,238 A | 5/1991 | McLeish et al. | |
| 5,276,630 A | 1/1994 | Baldwin et al. | |
| 5,306,995 A | 4/1994 | Payne et al. | |
| 5,412,291 A | 5/1995 | Payne et al. | |
| 5,950,709 A | 9/1999 | Krueger et al. | |
| 6,739,145 B2 | 5/2004 | Bhatnagar | |
| 2001/0015918 A1 | 8/2001 | Bhatnagar | |
| 2001/0039190 A1 | 11/2001 | Nakamura et al. | |

FOREIGN PATENT DOCUMENTS

WO    WO91/02300    2/1991
WO    WO 02/37298   10/2002

Primary Examiner—Thomas Pham

(57) ABSTRACT

A configurable controller, comprising a configurable digital unit having a synchronization control module; a plurality of signal acquisition modules connected with said synchronization control module for receiving reference control data therefrom; and a control logic connected with said plurality of signal acquisition modules; a plurality of input cells respectively connected with said plurality of signal acquisition modules, each input cell additionally connected with a respective input pin of said controller; and a synchronizing signal generator connected with said synchronization control module and with said plurality of input cells, for sending synchronization signals to said input cells, wherein each input cell is operable to convert input signal parameters to time-based parameters; and wherein each signal acquisition module is configured to convert said time-based parameters to a required digital form.

15 Claims, 13 Drawing Sheets

CONFIGURABLE CONTROLLER

CROSS-REFERENCE TO RELATED APPLICATIONS

This is a continuation of application Ser. No. 10/667,640 filed Sep. 22, 2003.

FIELD OF THE INVENTION

The present invention relates generally to controller systems having both analog and digital operating parameters and more particularly to a Computer to Plate (CTP) control device, such as an electronic printed board comprising a programmable logic and connected to both analog and digital peripherals.

BACKGROUND OF THE INVENTION

Modern technologies may include many processes that need to be controlled and automated. Using the example of CTP systems, these processes may comprise, for example: plate loading, plate unloading, conveying, centering and punching, drum balancing, etc. Electronic controllers are used to control these tasks.

A number of electronic controllers in use today are based on microprocessors that use software for defining the operation of the system. However, because of the different sensor types with different signal conditioning hardware or different loads with different driver types, use of the same controller board in different machines is often not feasible through changes in software only. Therefore, in present designs, the desired control functions are achieved by modifying the design and providing new circuitry for each model. This implies that a control system made for one type of sensor or load will not work with another one without requiring significant changes to the hardware.

An additional constraint of existing electronic controllers, which are programmed to perform desired control actions, is that microprocessors are limited in terms of interfaces. This limitation is caused by the fact that the architecture of microprocessors is computer-oriented rather than control-oriented. The actual environment of a control application typically involves the processing of a significant number of signals and devices (e.g. sensors, switches, motors, etc.), some of which are analog in nature. Consequently, a significant amount of circuitry is required in addition to the microprocessor, such as buffers, decoders, drivers, latches, multiplexers, analog-to-digital and digital-to analog converters, signal conditioning circuitry, etc.

FIG. 1 shows an example of typical hardware solutions needed to provide acquisition of different signal types.

The solution for motor encoder 10 logic signals includes filtering by filter 70 and buffering by logic input buffer 130 (low pass filter 70 should have a relatively high cut-off frequency to pass the encoder signals).

To receive the signals of slotted optical switches 20 with open collector output, a pull-up resistor 80 and a buffer 140 are needed. Also, a low pass filter (not shown) can be inserted.

For interlock door switches 30, usually used in standard 12V or 24V voltage supply safety loop, a voltage divider 90 is needed to reduce the input voltage signal to the level of logic supply (generally 5 or 3.3V), low pass filter 150 is needed to reduce bouncing and external noises (the cut off frequency of such a filter is different from the cut off frequency of filter 70 and buffer 160 is needed for fitting the signal to the configurable logic of digital unit 200.

One of the options for transferring analog signals, for example two pressure sensor signals 40 and 50, includes multiplexer 100, connected to ADC (Analog to Digital Converter) 170.

Some applications utilize reed switches with built-in LED indicator 60 e.g. NORGREN magnetically operated switch type QM/34. In this case, the solution may be based on a filter 110 and voltage comparator 190 using reference 180 as a threshold.

If the machine has a modular architecture, for example a manual machine, which by providing additional controlled subsystems can be upgraded to semiautomatic or fully automatic, the automation process may be realized either by a single multi I/O controller intended for all possible machine configurations or by three different smaller controllers, each dedicated to the manual, semiautomatic or fully automated configuration of the machine, respectively.

The drawback of the single multi I/O controller is in its inefficient utilization, especially in manual machines, since the controller hardware intended for semiautomatic and automatic modules is not used.

The drawback of three different dedicated controllers is in their higher service expenses and relatively high cost.

Let us assume that the target is to design a controller for a manual CTP machine (minimum automation level) comprising plate position detection, plate loading and plate unloading subsystems. The required subsystems include one motor encoder, ten slotted optical sensors with open collector output, and six door interlock switches.

The proper hardware solution for signals acquisition according to FIG. 1 will be the following:

For the motor encoder (signals ENCODER A and ENCODER B)—two filters 70 and two logic input buffers 130 are needed.

For ten slotted optical sensors with open collector output—ten pull up resistors 80 and ten logic input buffers 140 are suitable. Also, ten low pass filters (not shown) could be inserted.

For six door interlock switches—six voltage dividers 90, six filters 150 and six logic input buffers 160 are needed.

In order to be upgraded to semiautomatic, the CTP machine will need additional hardware, to provide signal acquisition and control for the new plate centering and plate punching automation subsystems containing, for example, three DC motors with encoders, eight slotted switches, two analog pressure sensors and two proximity sensors.

In this case, the controller should support six (3×2) encoder inputs instead of the two for the manual machine, eight slotted switches inputs instead of 10 and should have circuitry for supporting two analog and two plate short sensors, which were not used in the manual machine.

FIG. 2 shows an example of typical hardware solutions needed to provide control of different load types.

A possible solution for driving stepper motor 55 may be implemented by integrated stepper motor controller 120 (e.g. L297 stepper motor controller of SGS-Thomson microelectronics), connected to the outputs of the configurable digital unit 200 and driver 145 (e.g. L298—dual full bridge driver of SGS-Thomson Microelectronics), connected between stepper motor controller 120 and stepper motor 55. Such stepper motor control dedicated hardware can not be utilized for DC motor or valve control, which may be needed for different control environments of another model, for example for semiautomatic or fully automatic machines.

Similarly, the DC motor driver 115 (e.g. DMOS full-bridge PWM motor driver 3948 of ALLEGRO MicroSystems, Inc) connected between the configurable digital unit 200 and the DC motor 50, can not be used for separate valves or relay control, and the low drivers 155 (e.g. 6810 Latched Source Driver of ALLEGRO MicroSystems, Inc), controlled by configurable digital unit 200 and driving the 20 mA valves 60, can not be used for high current control solenoid driving application because of low current capability.

As can be seen, the controller hardware chosen for the manual machine cannot be used for controlling the subsystems of the semiautomatic machine, because of the differences in hardware solutions for acquisition of different sensor types and for controlling the different types of loads.

A similar situation occurs when upgrading from semiautomatic to fully automatic, or when trying to use the controller for a different family of machines.

Published U.S. patent applications Ser. No. US2001/0015918 and US2001/0039190 attempt to improve the above-mentioned shortcomings by providing a configurable electronic controller, comprising control circuitry for providing control functions, input interface, output interface, user interface, power interface and a non-volatile memory unit connected to the control circuitry and to all the above interface units, in order to configure them.

However, there are some barriers to the use of this solution in more complex machines, such as computer to plate (CTP):

1. The inputs of microcontrollers are not yet universal. This means that an analog sensor can not be connected to the digital input of the controller;

2. The digital inputs of a microcontroller can not provide the input hysteresis adjustment and input threshold control which are required for accepting input from sensors with different low and high logic levels, (for example, the low logic level of NORGREN magnetically operated switch type QM/34 is in the range of 2V, because of a built-in LED indicator. At the same time, the minimum input HIGH voltage of digital input buffer MOTOROLA SN74LS240 is 2V. Such difference in voltage levels can cause a faulty signal acquisition of QM34);

3. The provided solution involves hardware redundancy on the controller board; the controller architecture needs to include all possible functional blocks, configured by NV memory, to cover the different sensors' acquisition and, depending on the configuration, some of the functional blocks will not be used;

4. The provided solution provides a relatively low range of control. For example, the multiplexed signal acquisition of the controller leads to decrease in the controller response time. This disadvantage may become critical when dealing with e.g. CTP device controller, possibly handling over 100 sensors;

5. Using one fixed type of switch connected to one side of the load limits the load connection options (if the switch is high-side type, then the other side of the load should be connected to the common (ground) and if the switch is low-side type, then the other side of the load should be connected to the supplied voltage source. Generally, both load connections (to common and to voltage source) are used, but the mentioned Patent Applications can only support one kind of load connections;

6. No possibility to change current direction of loads needed, for example, for reversing DC motors.

Thus, there is a need for a universal, flexible controller architecture to enable improved upgradeability and serviceability and facilitate adaptation of an existing controller to a new machine.

SUMMARY OF THE INVENTION

According to one aspect of the present invention, there is provided a configurable controller comprising: a synchronization control module; a plurality of configurable signal acquisition modules connected with said synchronization control module; a control logic connected with said plurality of signal acquisition modules; a plurality of identical input cells respectively connected with said plurality of signal acquisition modules, each of said plurality of input cells additionally connected with a respective input pin of said controller; and a synchronizing signal generator connected with said synchronization control module and with said plurality of input cells, wherein each one of said plurality of input cells is operable to convert input signal parameters to time-based parameters; and wherein each of said signal acquisition modules is configured to convert said time-based parameters to a required digital form.

According to one embodiment, each of said plurality of identical input cells comprises a comparator, said comparator adapted to receive an input signal from the respective input pin, and a synchronization signal from said synchronizing signal generator, and to output a signal. The synchronization signal may have a saw-teeth shape.

According to another embodiment, the configurable controller additionally comprises a plurality of configurable output control logic modules connected with said control logic, said controller additionally comprising a plurality of high-side and low-side output drivers connected with said configurable output control logic modules, said drivers additionally connected with a plurality of output pins of said controller.

According to one configuration, at least one of said configurable output control logic modules is connected to one pair of high-side driver and low-side driver, said drivers connected through respective output pins of said controller to one side of a load, wherein said configurable output control logic module is configured to drive only one of said high-side driver and low-side driver, depending on said load's other side connection.

According to a second configuration, at least one of said configurable output control logic modules is connected to one of said low-side drivers or to one of said high-side drivers, said one driver connected through a respective output pin of said controller to a load, wherein said configurable output control logic module is configured to drive said one driver.

According to a third configuration, a first and second ones of said configurable output control logic modules are connected respectively to one pair of high-side driver and low-side driver, said high-side driver and said low-side driver connected through two respective output pins of said controller to two sides of a load, wherein said first and second configurable output control logic modules are configured to control said pair of high-side driver and low-side driver by two independent signal sources.

According to a fourth configuration, at least one of said configurable output control logic modules is connected to two of said high-side drivers, said two high-side drivers connected through respective output pins of said controller to one side of a load, wherein said configurable output control logic module is configured to simultaneously control said two high-side drivers.

According to another embodiment, at least one of said high-side or low-side drivers is connected to one of said input cells. The input cell may be operable to measure the current of said at least one high-side or low-side driver, or to detect connectivity of said at least one high-side or low-side driver. The input cell may alternatively be operable to confirm switching of said at least one high-side or low-side driver.

In another aspect of the present invention, there is provided a method of acquiring a plurality of signals, comprising the steps of: providing a synchronization control module; configuring a plurality of configurable signal acquisition modules connected with said synchronization control module; providing a control logic connected with said plurality of signal acquisition modules; providing a plurality of identical input cells respectively connected with said plurality of signal acquisition modules; providing a synchronizing signal generator connected with said synchronization control module and with said plurality of input cells, acquiring a plurality of input signals, each said signals acquired by one of said plurality of identical input cells; converting said acquired signal parameters into a plurality of time-based parameters; and converting said plurality of time-based parameters into required digital forms.

According to one embodiment, the step of converting said acquired signal parameters into a plurality of time-based parameters comprises the steps of: receiving a synchronization signal from said synchronizing signal generator; and comparing said acquired input signal with said synchronization signal. The synchronization signal may have a sawteeth shape.

According to yet another aspect of the present invention, there is provided a configurable controller for controlling a plurality of loads, comprising: a control logic; a plurality of configurable output control logic modules connected with said control logic; and a plurality of high-side and low-side output drivers connected with said configurable output control logic modules, said drivers additionally connected with a plurality of output pins of said controller.

According to one configuration, at least one of said configurable output control logic modules is connected to one pair of high-side driver and low-side driver, said drivers connected through respective output pins of said controller to one side of a load, wherein said configurable output control logic module is configured to drive only one of said high-side driver and low-side driver, depending on said load's other side connection.

According to a second configuration, at least one of said configurable output control logic modules is connected to one of said low-side drivers or to one of said high-side drivers, said one driver connected through a respective output pin of said controller to a load, wherein said configurable output control logic module is configured to drive said one driver.

According to a third configuration, a first and second ones of said configurable output control logic modules are connected respectively to one pair of high-side driver and low-side driver, said high-side driver and said low-side driver connected through two respective output pins of said controller to two sides of a load, wherein said first and second configurable output control logic modules are configured to control said pair of high-side driver and low-side driver by two independent signal sources.

According to a fourth configuration, at least one of said configurable output control logic modules is connected to two of said high-side drivers, said two high-side drivers connected through respective output pins of said controller to one side of a load, wherein said configurable output control logic module is configured to simultaneously control said two high-side drivers.

According to an additional aspect of the present invention, there is provided a method of controlling a plurality of loads, comprising the steps of:

providing a control logic; providing a plurality of configurable output control logic modules connected with said control logic; providing a plurality of high-side and low-side output drivers connected with said configurable output control logic modules, said drivers additionally connected with a plurality of output pins of said controller; and configuring each of said plurality of configurable output control logic modules to drive at least one of said high-side and low-side drivers, said configuring according to the connections between said loads and said drivers.

According to one configuration, at least one of said configurable output control logic modules is connected to one pair of said high-side driver and low-side driver, said drivers connected through respective output pins of said controller to one side of a load, wherein said configurable output control logic module is configured to drive only one of said high-side driver and low-side driver, depending on said load's other side connection.

According to a second configuration, at least one of said configurable output control logic modules is connected to one of said low-side drivers or to one of said high-side drivers, said one driver connected through a respective output pin of said controller to a load, wherein said configurable output control logic module is configured to drive said one driver.

According to a third configuration, a first and second ones of said configurable output control logic modules are connected respectively to one pair of high-side driver and low-side driver, said high-side driver and said low-side driver connected through two respective output pins of said controller to two sides of a load, wherein said first and second configurable output control logic modules are configured to control said pair of high-side driver and low-side driver by two independent signal sources.

According to a fourth configuration, at least one of said configurable output control logic modules is connected to two of said high-side drivers, said two high-side drivers connected through respective output pins of said controller to one side of a load, wherein said configurable output control logic module is configured to simultaneously control said two high-side drivers.

BRIEF DESCRIPTION OF THE DRAWINGS

For a better understanding of the invention and to show how the same may be carried into effect, reference will now be made, purely by way of example, to the accompanying drawings.

DETAILED DESCRIPTION OF THE PRESENT INVENTION

Figure 1:
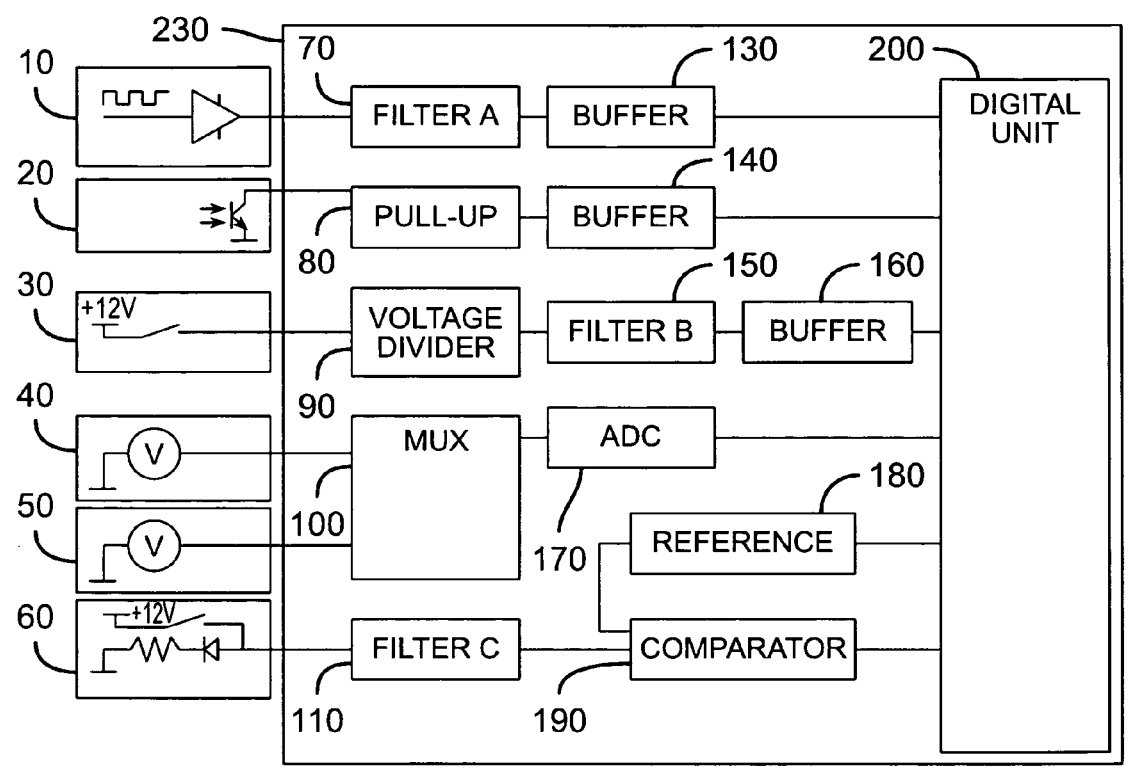
FIG. 1 is an example of typical hardware solutions needed to provide acquisition of different input signal types.
Figure 2:
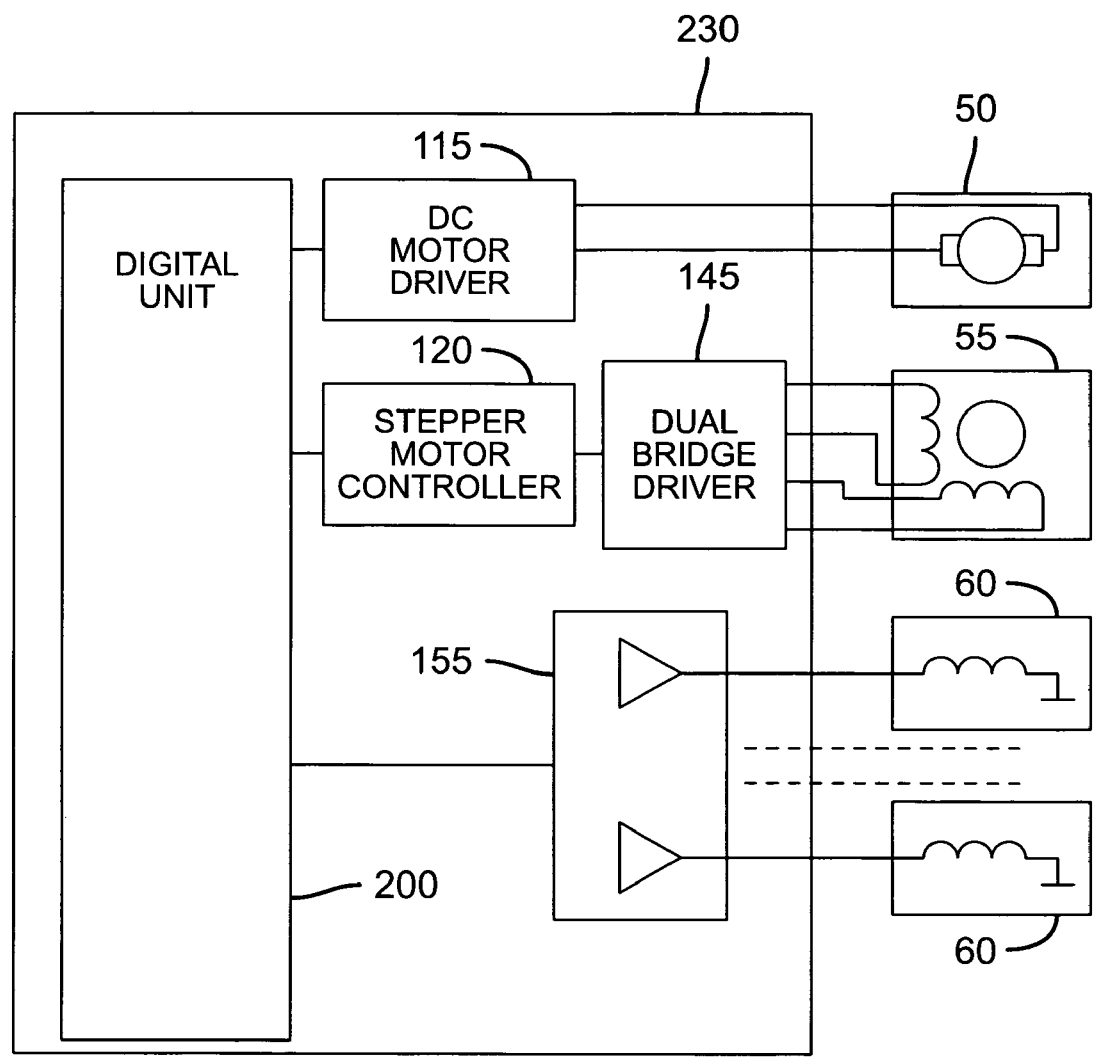
FIG. 2 is an example of typical hardware solutions needed to provide control of different load types.

The present invention provides a configurable controller architecture, to overcome the deficiencies of existing controllers.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
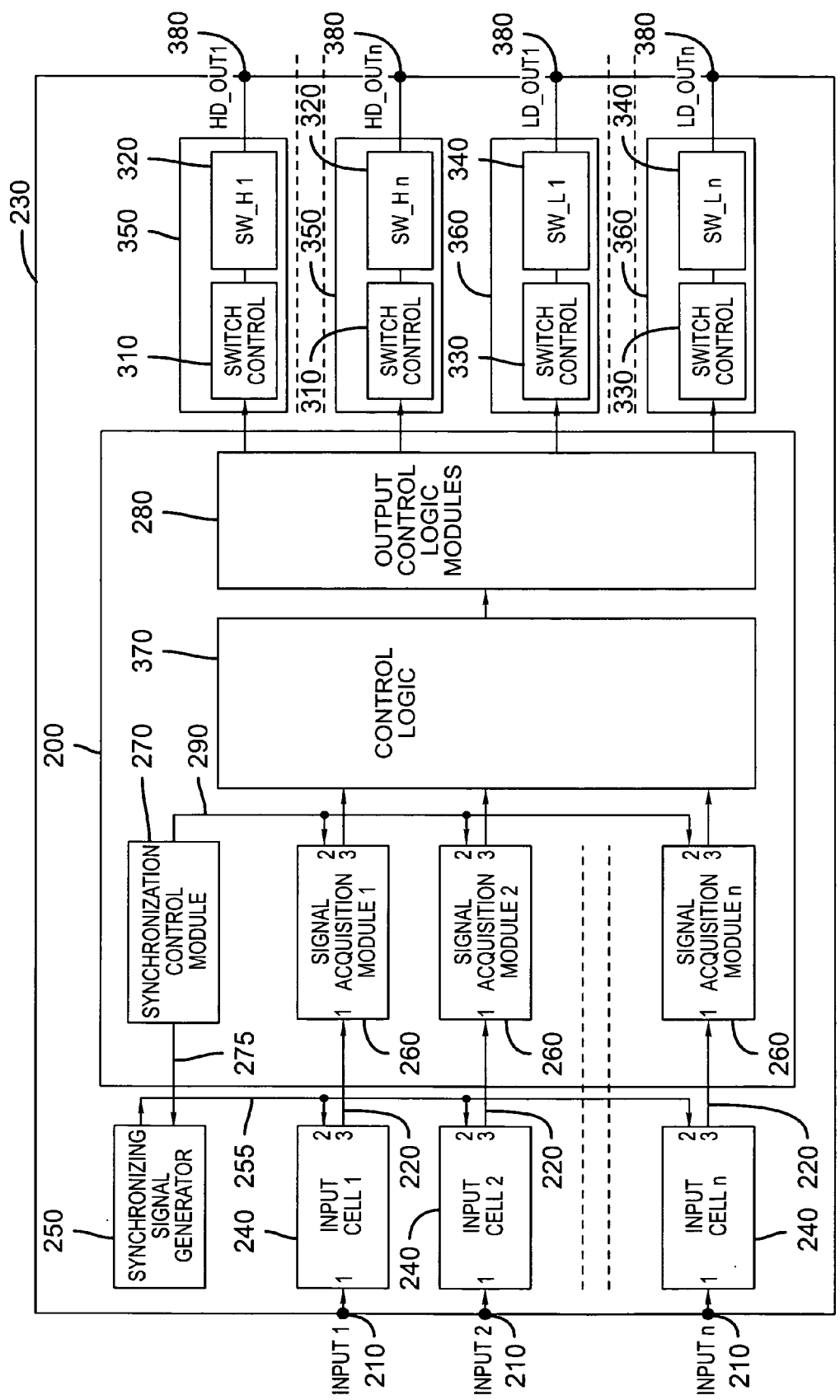
FIG. 3 is a general block diagram of the controller of the present invention.

FIG. 3 is a general block diagram of the controller 230 of the present invention, comprising synchronizing signal generator 250, configurable digital unit 200, such as FPGA or CPLD, which comprises at least synchronization module 270, control logic 370, a number of signal acquisition modules 260, configured to accept signals coming from the input pins 210 of the controller 230 through identical input cells 240, configurable output control logic modules 280, configured to provide control of the loads connected to the output pins 380 of the controller 230, through high-side 350 and/or low-side 360 output drivers.

The proposed system is designed to support various peripheral environments, using its configuration ability.

The synchronization module 270 of the configurable digital unit 200 is configured to generate the basic time-dependent signals, in order to synchronize the work of the input cells 240 and signal acquisition modules 260. Such synchronization is needed for conversion of input signal values to time-based parameter (e.g. pulse width, delay, duty cycle, frequency, etc.) by input cells 240, and then for converting these time-based parameters to digital form by means of configured signal acquisition modules 260. One possible implementation of synchronization module 270 may be, for example, a counter, which counts incoming pulses with constant interval between them. The sequence of such pulses can be obtained from the system clock, for example. The output (reference data 290) of counter 270 is connected to each of the signal acquisition blocks 260 and also to synchronizing signal generator 250 as a sync data 275. Synchronizing signal generator 250 is implemented, for example, as a digital to analogue converter. While counter 270 is running, the value of the sync data 275, which is equal to reference data 290, is periodically changed from 0 to its maximum value, which causes a saw-teeth shape voltage Vsync on the output net 255 of synchronizing signal generator 250. This voltage is transferred to the second input of input cells 240. The first input of the input cells 240 is connected to the corresponding input pin 210 of controller 230 respectively. The output signal of input cell 240 (pin 3) is connected to the input 1 of corresponding signal acquisition block 260. In an alternative embodiment of synchronization control module 270, sync data 275 and reference data 290 may not be equal, as will be exemplified in conjunction with FIG. 4.

The implementation of configurable signal acquisition blocks 260 may vary according to the type of signal that needs to be accepted and thus supports the different peripheral environments.

Figure 4:
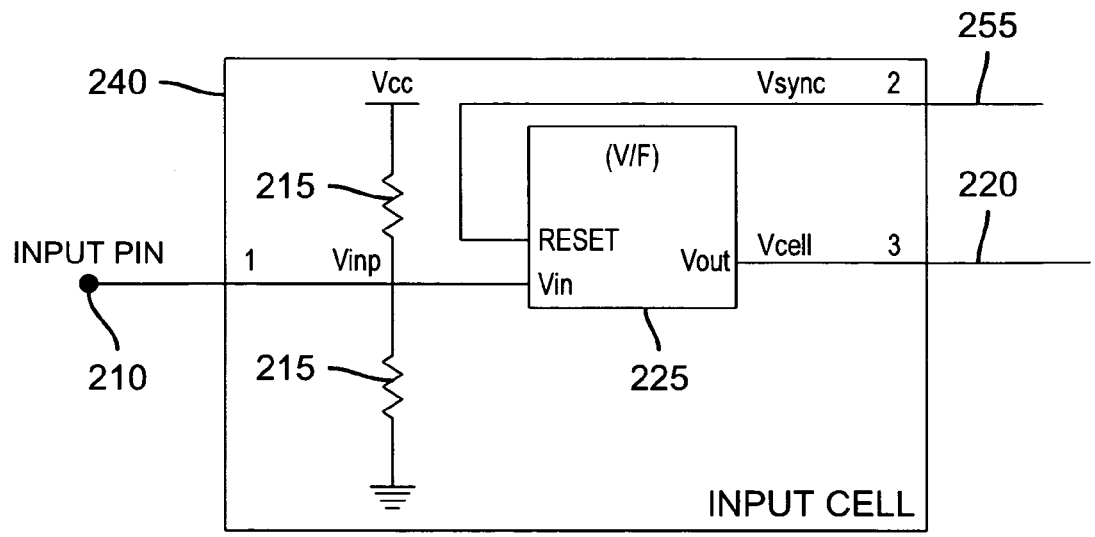
FIG. 4 is a schematic drawing of one embodiment of the input cell according to the present invention.
Figure 5:
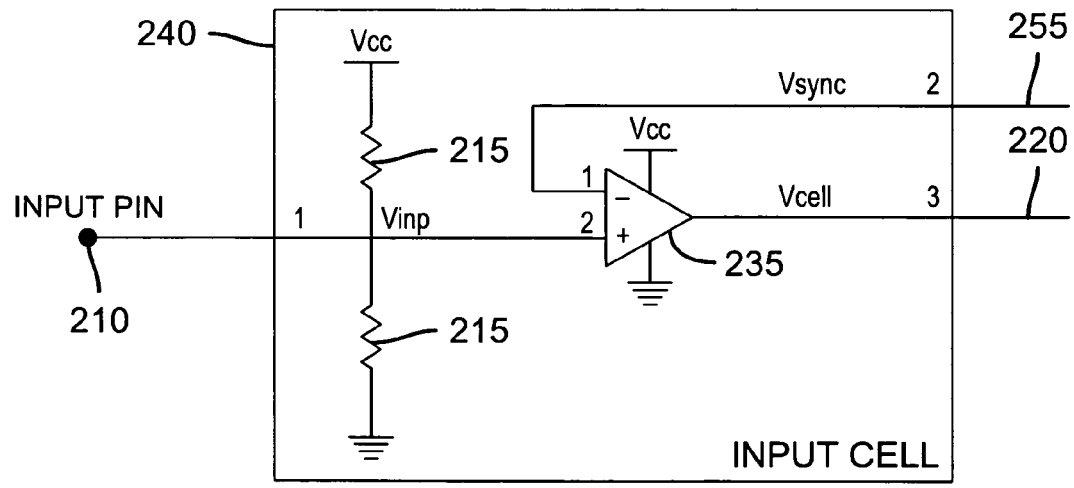
FIG. 5 is a schematic drawing of a preferred embodiment of the input cell according to the present invention.

Two examples of possible embodiments of input cell 240 are shown in FIGS. 4 and 5. The input cell of FIG. 4 is based on voltage-to-frequency converter 225, for example LM131 of National Semiconductor. For this implementation, the synchronization control module 270 should be configured such that sync data 255 presents a sequence of short pulses, which appears periodically (once per counting period). The reference data 290 should be implemented as described above with reference to FIG. 3. The synchronizing signal generator 250 may be implemented, for example, as a buffer or amplifier. The short sync pulses 255 coming from synchronizing signal generator 250 will reset the V to F converter 225 and after the end of each reset, the frequency proportional to the input voltage value will appear on the output of the converter and on the net 220 accordingly. This frequency passes to the input of corresponding signal acquisition module 260, which should be configured to convert the frequency value to the digital form, (one or more bits) convenient for performing control (for example by counting incoming pulses per time-unit equal to the counting period of synchronization control module 270).

A preferred embodiment of input cell 240 is shown in FIG. 5. The cell contains a comparator 235, for example LM2901 of Texas Instruments. Input 1 of comparator 235 is connected to synchronizing signal generator 250 output net. Input 2 of comparator 235 is connected to the input 210 pin of the controller 230. Output 3 of comparator 235 is actually the output of the input cell 240 and should be connected to the input of a signal acquisition module 260 of configurable digital unit 200. Resistors 215 are optional and intended to bias the input of the comparator in case switch type or open collector output type of sensor is used. These resistors should have a relatively high resistance (tens or hundreds of k Ohms) in order to eliminate their influence on the sensor. To support the present embodiment of input cell 240, the synchronization module 270 should be configured as the counter described above. The reference data 290 and sync data 275 of the counter are equal in this case. Also, to support the present embodiment of input cell 240, the synchronizing signal generator 250 should be implemented, for example, as a Digital to Analog converter.

While the controller is powered, the comparator 235 of signal acquisition input cell 240 compares the saw-teeth shape voltage Vsync coming from the output of synchronizing signal generator 250 through net 255, with the signal Vinp of the peripheral detector, connected through input pin 210 of the controller 230 to the positive input of comparator 235. The result of comparing is the output signal Vcell of input cell 240

The flexibility of the controller device of the present invention will be explained by description of its functionality with different exemplary types of peripheral detectors.

EXAMPLE 1

Controller Functionality with Analog Output Sensors

Figure 6:
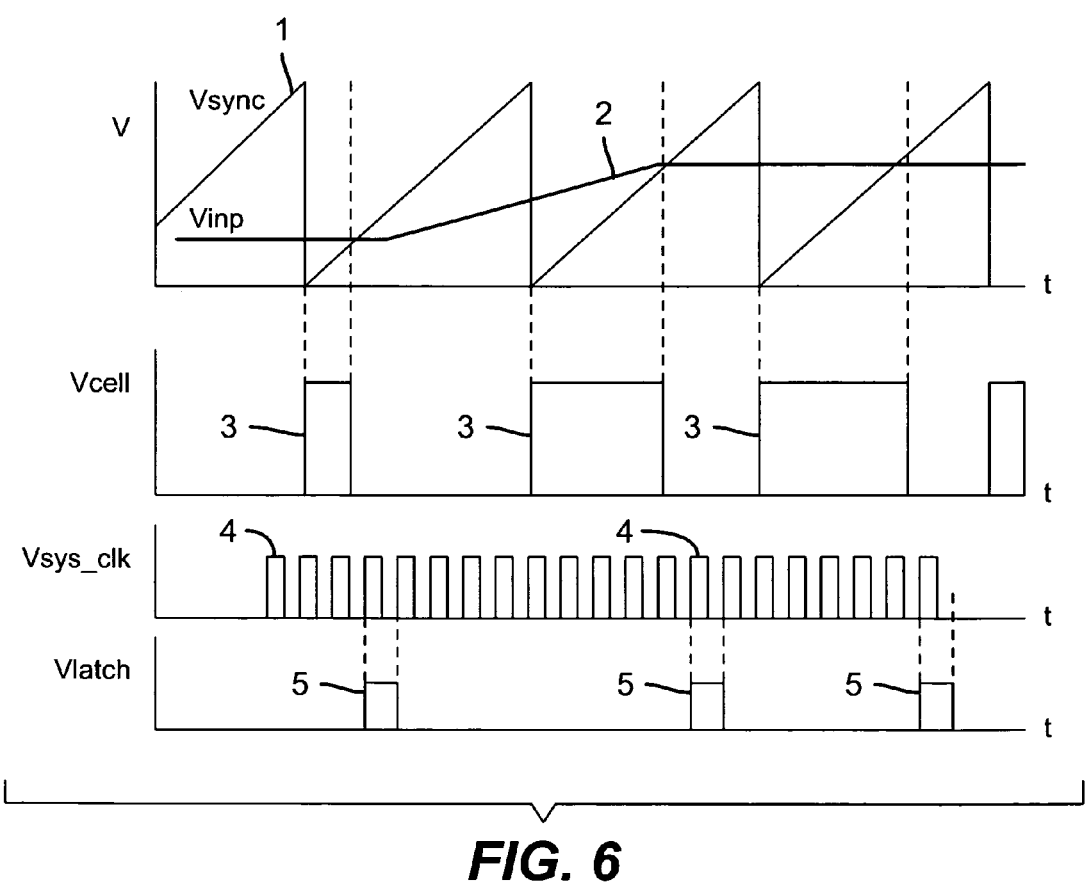
FIG. 6 shows timing diagrams of the input cell of FIG. 5 and the signal acquisition module according to the present invention, configured for analog sensor acquisition.

FIG. 6 shows timing diagrams of input cell 240 of FIG. 5 (lines 1, 2, 3) and signal acquisition module 260 (lines 4, 5) for analog sensor acquisition, e.g. pressure sensors, in which output voltage varies according to the tested pressure.

In this case, the analog input signal Vinp (line 2) is compared by comparator 235 of input cell 240 with saw-teeth formed sync voltage Vsync (line 1). When the Vinp signal is higher than Vsync, the comparator 235 output voltage Vcell (line 3) is high; otherwise it is low. The Vcell signal enters signal acquisition block 260 via net 220.

Figure 7:
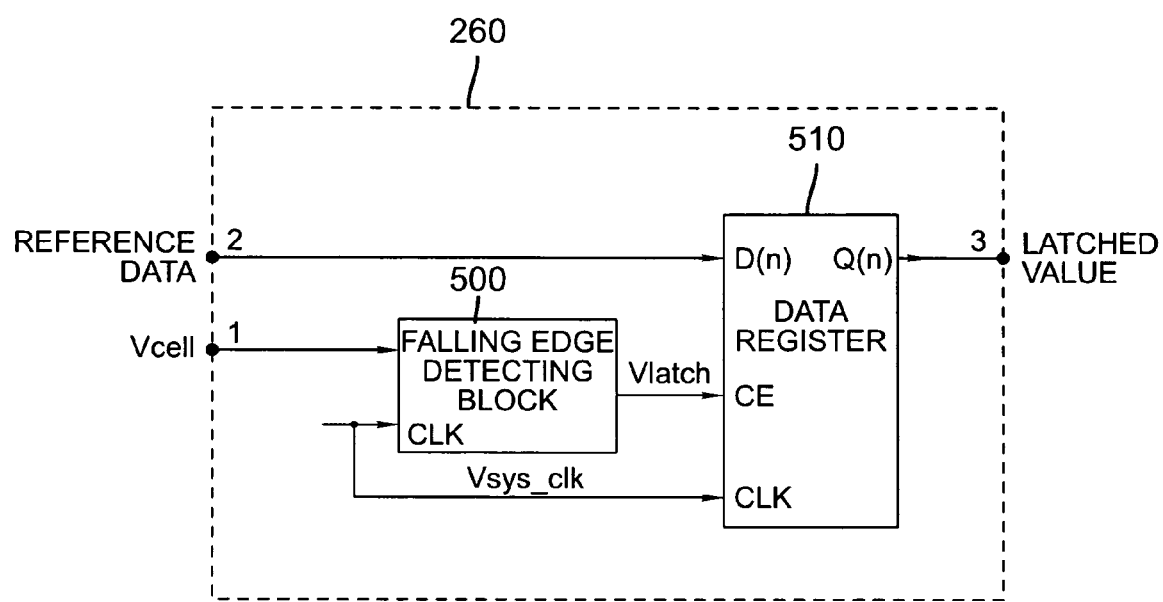
FIG. 7 is a block diagram of the signal acquisition module according to the present invention, configured for analog signal acquisition.

FIG. 7 is a block diagram of signal acquisition block 260 configured for analog signal acquisition. The block consists of falling edge detecting block 500 and data register 510. The falling edge detecting block 500 generates one system-clock long pulse Vlatch every time signal Vcell, coming from input cell 240 to input 1 of signal acquisition block 260, change its value from high to low. This pulse enables the latching of reference data 290, coming on the second input of signal acquisition block 260, in data register 510. According to the comparator equation (Vsync=Vinp), the latched data has a value equal to the analog sensor output voltage to be measured. This latched data appears on output 3 of the signal acquisition module 260 and can be used as an input signal value for control purposes.

EXAMPLE 2

Controller Functionality with Slotted Optical Switches with Totem-Pole Output

Figure 8:
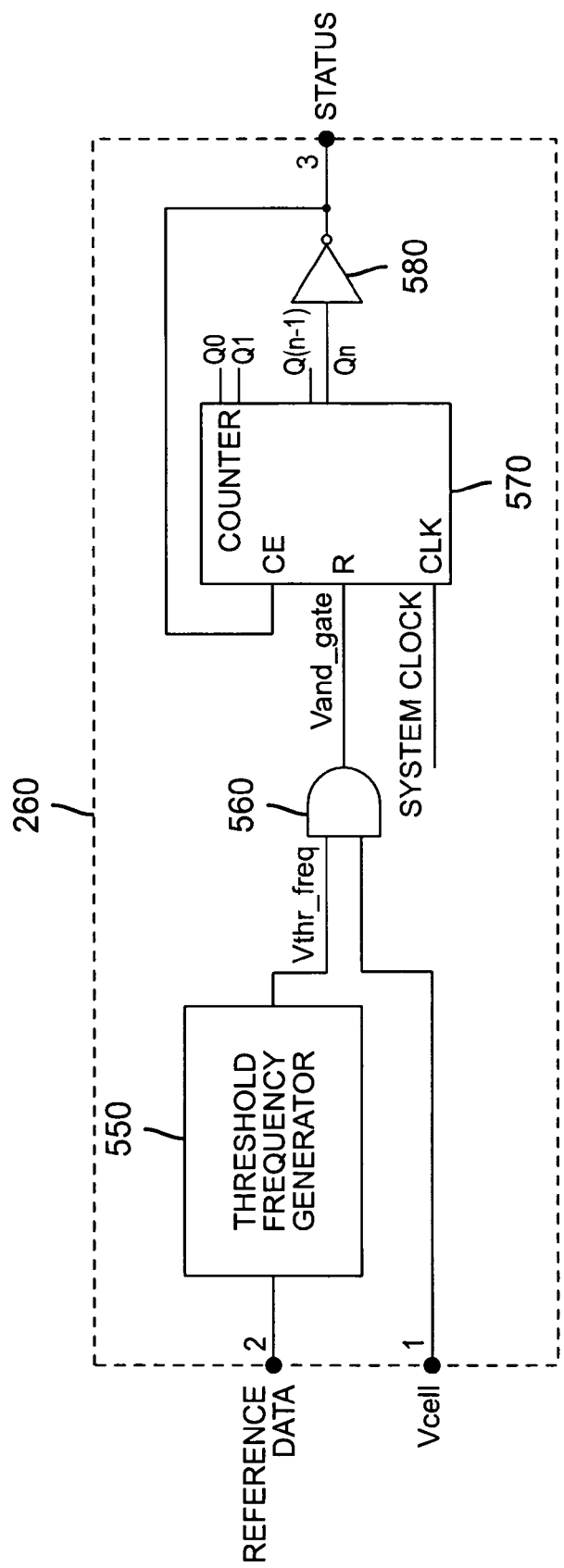
FIG. 8 is a block diagram of the embodiment of the signal acquisition module according to the present invention, for the purpose of totem-pole output sensors.

FIG. 8 is a block diagram of the embodiment of signal acquisition block 260 for the purpose of totem-pole output sensors, e.g. wide gap type OPTEC OPB900W.

The configuration of signal acquisition module 260 intended to support the Totem-Pole Output switches comprises threshold frequency generator 550, connected with its input to reference data bus 290 coming to the second input of the module 260, and connected with its output (signal Vthr_freq) to the first input of AND gate 560. The second input of the AND gate 560 receives the output Vcell of input cell 240 through input 1 of module 260. The AND gate output signal (Vand_gate) is connected to the input RESET of counter 570. The most significant bit (Qn) of the counter output is inverted by inverter 580 and connected to the Chip Enable (CE) input of counter 570 and to the output 3 of signal acquisition module 260.

Figure 9:
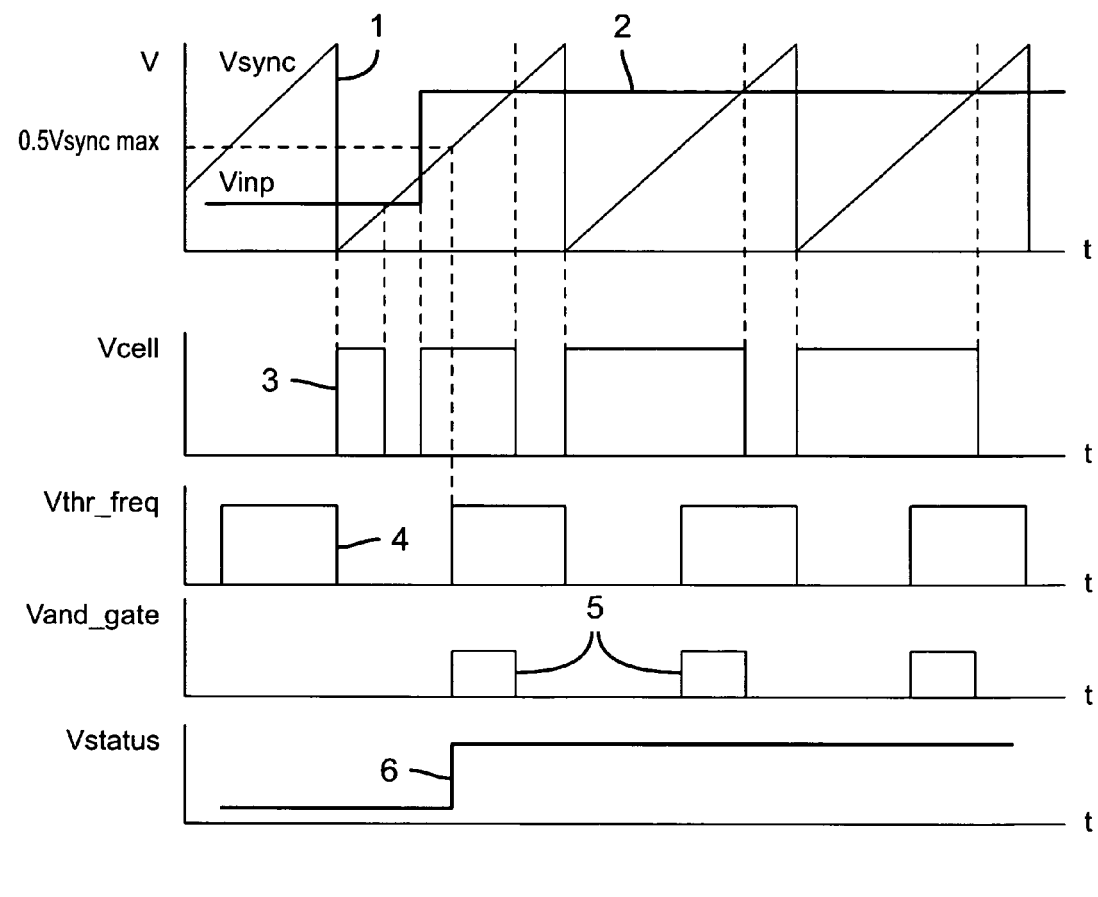
FIG. 9 shows the timing diagrams describing the signal acquisition of totem-pole output sensors.

FIG. 9 shows the timing diagrams describing the signal acquisition of totem-pole output sensors. Signal Vcell (curve 3), generated by the input cell, is the result of a comparison between a saw-teeth shape voltage Vsync (curve 1) and the input signal Vinp coming from the Totem-Pole Output switch (curve 2). Signal Vcell is accepted by the first input of the AND gate 560 of signal acquisition block 260. The second input of the AND gate receives the threshold frequency signal Vthr_freq, generated from DATA by threshold frequency generator 550. This module generates frequency with the period equal to synchronization module 270 data counting cycle (from zero to maximum value). The duty cycle of this frequency should be predetermined according to desired threshold for input signal logic level determination. Curve 4 shows the threshold frequency with duty cycle equal to 50%. This means that the threshold frequency signal will be high only when the saw-teeth voltage reference value is higher than half of its maximum value.

The AND gate 560 in this case plays a role of detector, which detects the overcoming by input signal of the 50% value of Vsync maximum voltage. Every time Vcell is high and Vthr_freq is high, the AND gate output (curve 5) will also be high, thus indicating that Vinp is over the predetermined threshold value (in this example 50% of Vsync maximum).

While Vand_gate is low, the counter 570 will count until the most significant bit gets high. At that moment, inverter 580 will block the counter by low logic level on its output and the counter will remain in this condition. While Vinp is over the predetermined threshold, the reset occurs and the pulses from the AND gate output will reset the counter and its most significant bit (MSB) will be low. The inverted MSB value shows the status of the sensor (curve 6).

Another embodiment (not shown) of signal acquisition block 260, providing hysteresis, may also be implemented.

EXAMPLE 3

Figure 10:
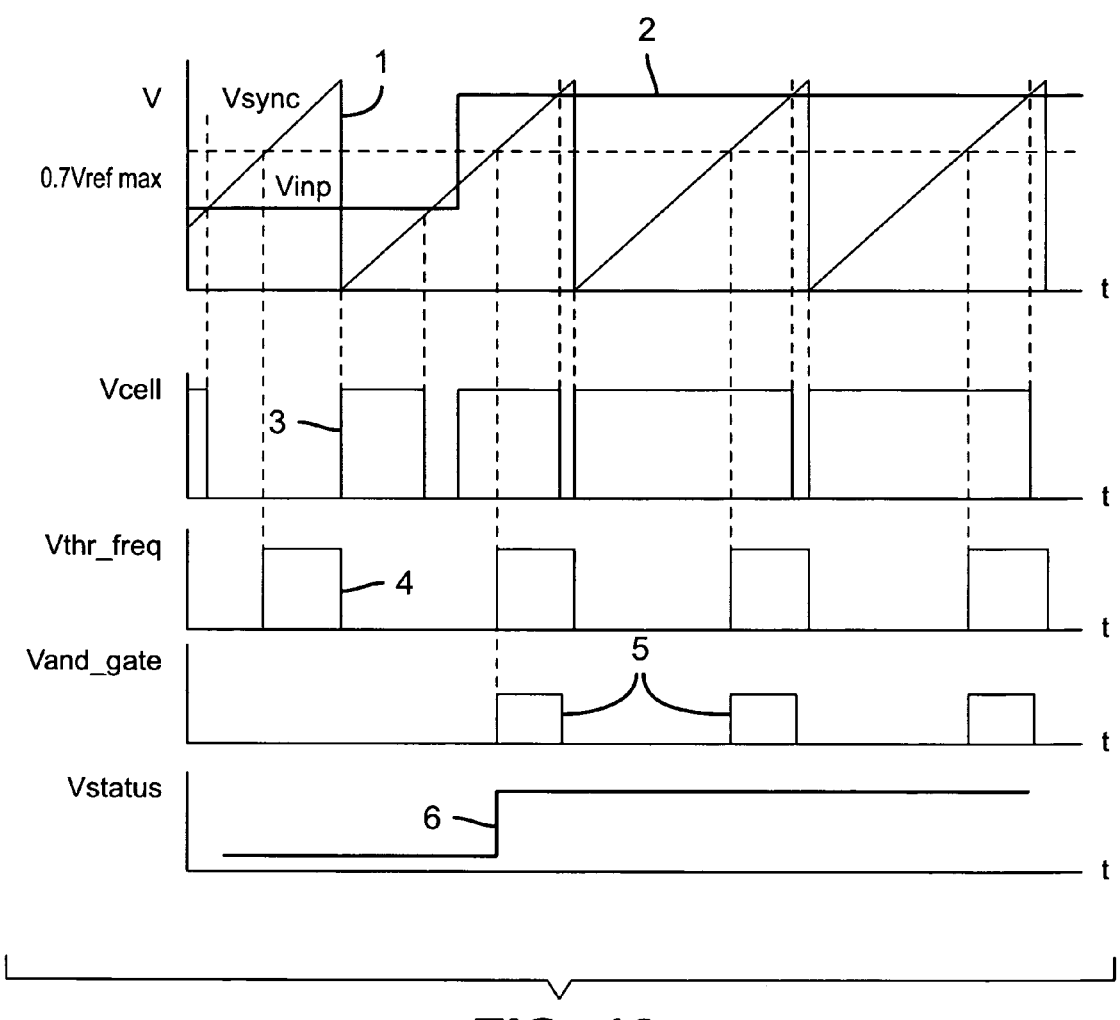
FIG. 10 shows timing diagrams describing the functionality of the signal acquisition module according to the present invention for proximity sensors with LED indication.

Controller Functionality with Proximity Sensors (e.g. NORGREN Magnetically Operated Switch Type QM/34), with Built-in LED Indicator The architecture of signal acquisition block 260 should be the same as that shown in FIG. 8, but the threshold frequency generator 550 should be slightly changed. The timing diagrams, describing the functionality of the signal acquisition block 260 intended for proximity sensors with LED indication are shown in FIG. 10.

The proximity sensor signal Vinp (curve 2) has higher value of its logic low state than described in the previous example for totem-pole output sensor (FIG. 9, curve 2). This means that the best acquisition of the proximity sensor will be at a higher threshold, for example 70% of Vsync maximum value, instead of 50% in the previous example. As was shown, the duty cycle of the Vthr_freq defines the threshold for generating the status of input signal (High or low). Thus, to increase the threshold, the threshold frequency generator 550 should be configured so that Vthr_freq (curve 4) will be low while Vsync (curve 1) is lower than 70% of it's maximum value and Vthr_freq should be high while Vsync is higher than 70% of it's maximum value. In other words, Vthr_freq will have 30% (100%–70%) duty cycle, which is an optimal threshold for input signal acquisition. The logic of signal generating for Vand_gate (curve 5) and Vstatus (curve 6) is the same as in the previous example.

The flexibility of the controller to control different types of loads is provided (FIG. 3) by means of configuration of configurable output control logic modules 280 and connection to a predetermined number of low-side 360 and high-side 350 drivers. Each driver is controlled by configurable output control logic modules 280 of configurable digital unit 200 and connected by its outputs (HD_OUT or LD_OUT) respectively to an output pin 380 of the controller 230. Every high-side driver 350 consists of a high-side switch control unit 310 and high-side power switch 320; every low-side driver 360 consists of a low-side switch control unit 330 and low-side power switch 340. The applications of low- and high-side drivers for specific loads are known. The novelty of using them in the controller of the present invention is in the fact that in order to achieve the flexibility of the controller, the specific configurable output control blocks 280 are configured in the configurable logic of digital unit 200 to control the predetermined loads. The drivers 350 and 360 can be grouped in different combinations. Every suitable drivers combination for a specific load control is supported by configuration of configurable output control logic module 280, which is intended to control the mentioned group.

Figure 11:
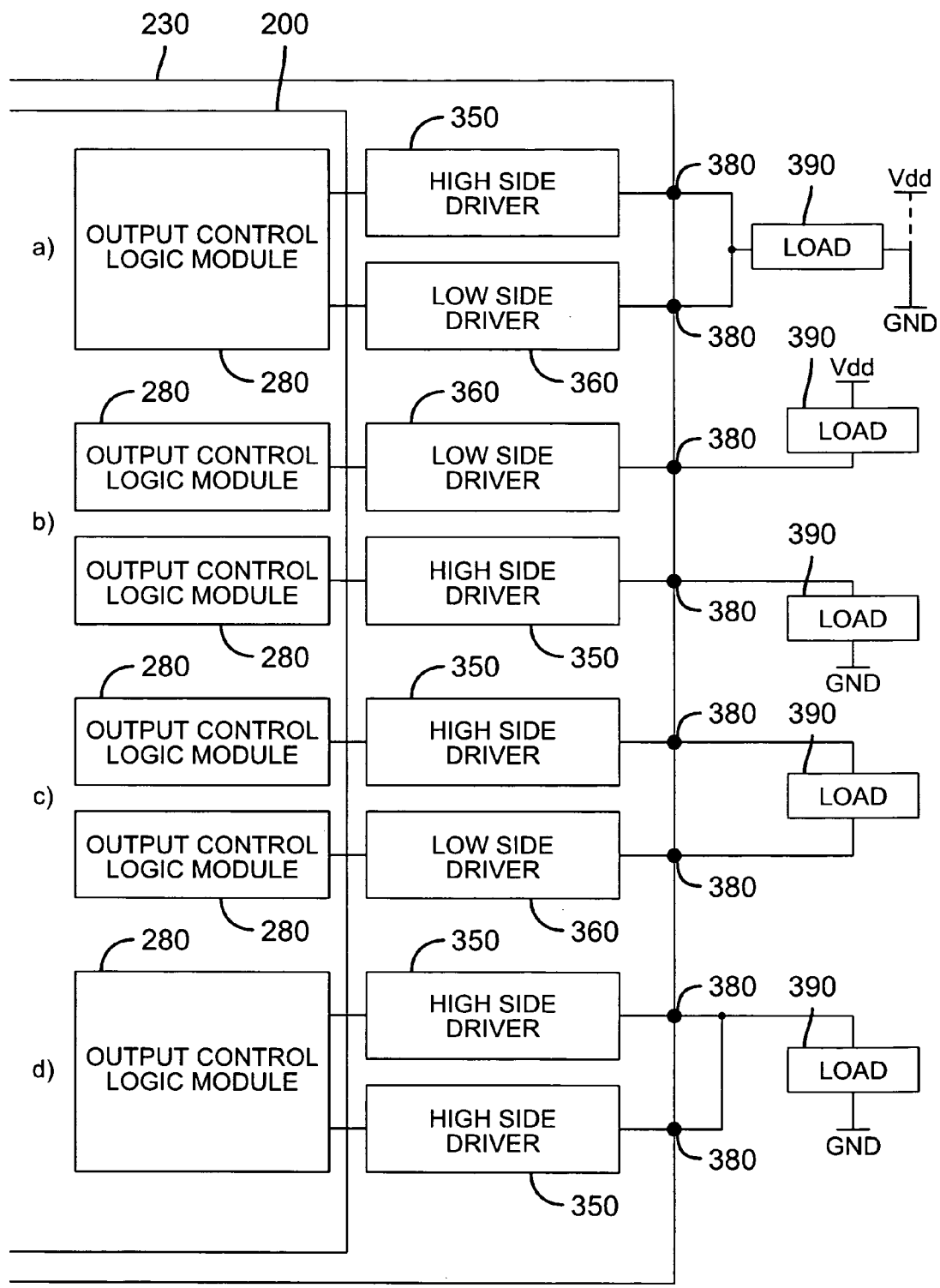
FIG. 11 is a block diagram of a preferred embodiment of the controller, driving different loads such as solenoid, relay and lamp.
Figure 12:
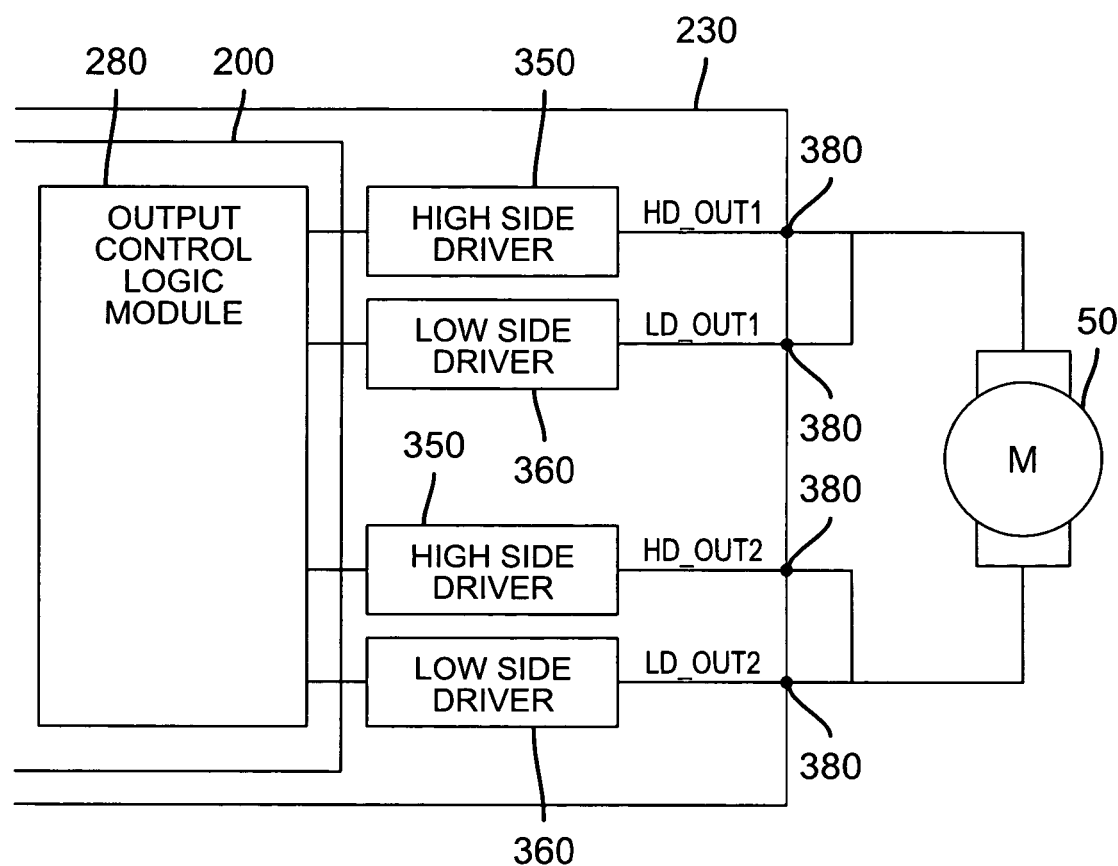
FIG. 12 shows a preferred embodiment of DC or AC motor control.
Figure 13:
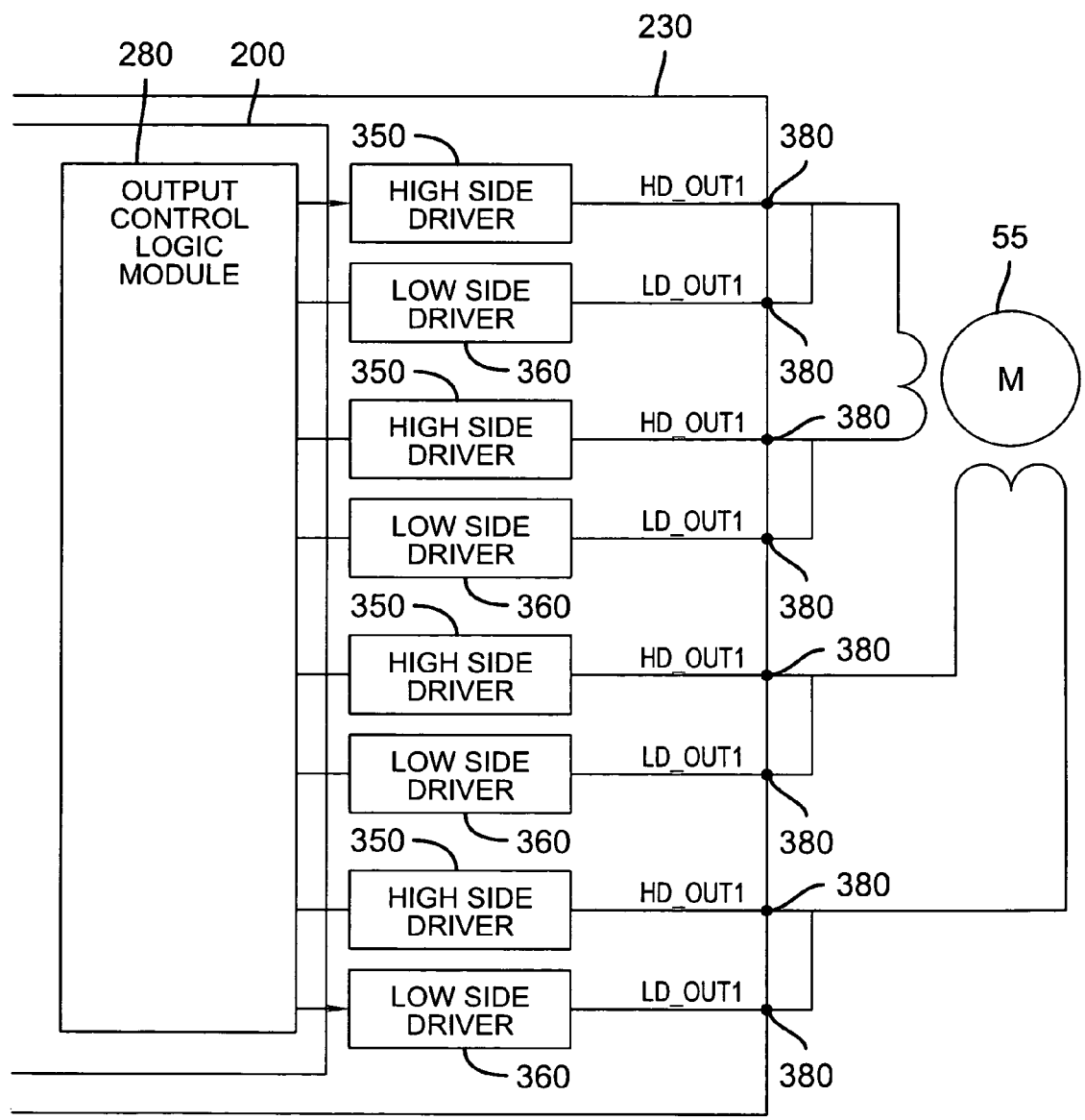
FIG. 13 shows a preferred embodiment of stepper motor control.

The examples of controlling different load types, such as DC, AC and stepper motor as well as valve, solenoid and relay and the ability to increase the controller current capability are shown in FIGS. 11, 12 and 13.

EXAMPLE 4

Controller Functionality with Solenoid, Relay, or Lamp Loads

FIG. 11 is a block diagram of a preferred embodiment of the controller, driving different loads such as solenoid, relay, lamp etc.

To control loads independently of the load's second pin connection (FIG. 11*a*), the present controller provides a configuration of configurable output control logic module 280 for two drivers 350 and 360, connected to the second pin of the load. When the load 390 is connected to ground terminal (solid line), the configurable output control logic module 280 performs control through the high-side driver 350 and the low-side driver is in an Off state. Similarly, if the load 390 is connected to power Vdd terminal (dashed line), the configurable output control logic module 280 performs control through the low-side driver 360 and the high-side driver in an Off state A load can also be controlled by a single high-side driver or a single low-side driver, depending on the second load terminal connection (FIG. 11*b*). When it is a ground terminal, the control should be provided by the high-side driver and when it is a power terminal, the control should be provided by the low-side driver. Each of the control channels should have it's own configurable control module 280.

The safe load control which is provided by two independent sources (for example the control source and enable condition source) is shown in FIG. 11*c*. In this case, the load 390 is connected between the high-side driver 350 and the low-side driver 360 outputs. The safety control architecture is supported by configuration of two configurable output control logic modules connected to the high and low-side drivers respectively and controlled by two independent signal sources coming through the configurable logic of digital unit 200.

Increasing of the current capability of the controller can be achieved by connecting the high current load to more than one output of the controller. For example, to increase the current capability of the controller's output by a factor of two, the ground-connected load is controlled by two high-side drivers 350 (FIG. 11*d*). This control is provided by configuration of configurable output control logic module 280, responsible for simultaneously controlling the two high-side drivers.

EXAMPLE 5

Controller Functionality with DC and AC Motors

The preferred embodiment of DC or AC motor control is shown in FIG. 12. The DC motor 50 is connected between common connections of high-350 and low-360 side drivers. The four drivers configured in this example form a bridge drive circuit. The control of the motor is provided by configuration of the corresponding control module 280, having all the logic functions for supporting the bridge control circuitry. The configuration of FIG. 12 can also be used for driving AC motors, by providing PWM control to the bridge circuit and thus obtaining AC on the bridge output.

EXAMPLE 6

Controller Functionality with Stepper Motors

The preferred embodiment of stepper motor control is shown in FIG. 13. Each stepper motor 55 winding is connected to the output of a bridge drive circuit as described above. The synchronizing of stepper motor windings current and logic needed for stepper motor control, is performed by output logic module 280 configured for this purpose, which is connected by it's outputs to the low 350 and high-side drivers 360 respectively.

Summarizing examples 4-6, it can seen that by means of configuration of configurable output control logic modules 280, together with an ability to combine high- and low-drivers and connect them to the loads, the present invention provides a universal and flexible controller, adaptable to different machine environments. Some of them are: separate load control dependent on load connection; separate load control independent of load connection; safe load connection by two independent channels; DC, AC and stepper motors control; and increasing current capability for high current load applications, e.g. solenoids, relays, motors, etc.

EXAMPLE 7

Feedbacks in Controller Functionality

Figure 14:
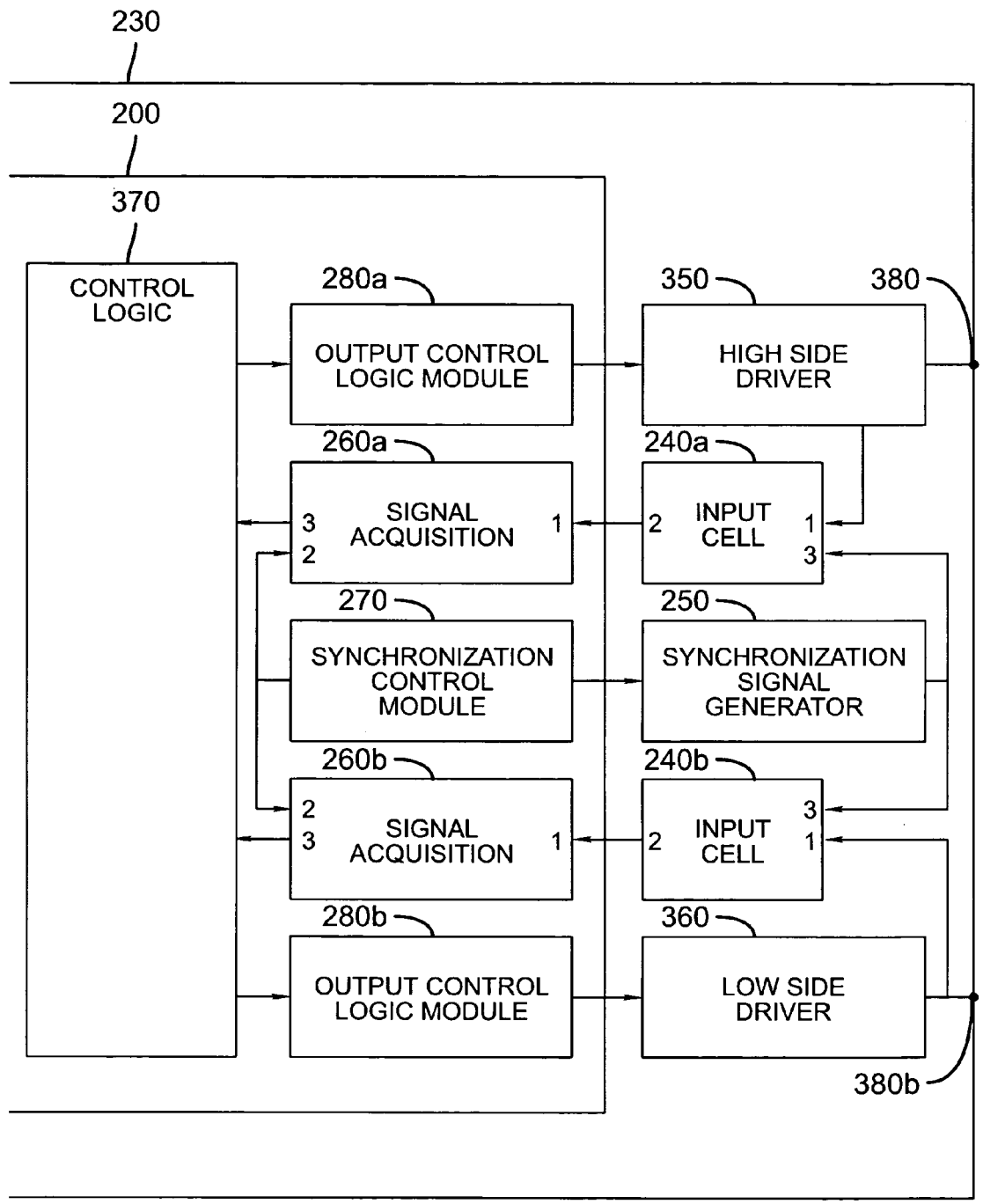
FIG. 14 is a block diagram of a preferred implementation of current and voltage feedbacks in the controller.

The preferred embodiment of the controller 230 utilizing input cells 240 for providing current and voltage feedbacks are shown in FIG. 14.

The signal proportional to the high-side 350 driver current is measured by input cell 240*a* and signal acquisition block 260*a*. The measuring data can be used, for example, to provide short circuit protection of the driver and it's load. In other words, the control logic 370 will force the configurable output control logic module 280*a* to an Off state if the measured current value is larger than a predetermined value contained in control logic 370, thus performing the short circuit protection. The input cell can be also connected to any low-side driver in order to measure the drivers (load) current. The short circuit protection will work in the same manner as described for high-side driver current protection.

Another type of feedback is implemented by means of input cell 240*b*, connected by its input 1 to the output of the low-side driver 360. In this case the feedback can be used for detecting of load connection or disconnection. If the load is connected to the low-side driver and the driver is in an Off state, then the load supply voltage potential will appear on the output pin 380*b* of the controller 230 and low-side driver 360 output respectively. This high value can be detected by input cell 240*b* and signal acquisition block 260*b*. The detection of high voltage value on the output of the low-side driver means that the load is connected to the driver. When the load is disconnected, the output of the low-side driver will have low value and the detection of this value will indicate the disconnection of the load. Such connection can be used also for confirmation of low-side driver switching. The same goals can be achieved by connecting the input cell to the output of the high-side driver.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A configurable controller comprising:
   a synchronization control module;
   a plurality of configurable signal acquisition modules connected with said synchronization control module;
   a control logic connected with said plurality of signal acquisition modules;
   a plurality of input cells respectively connected with said plurality of signal acquisition modules, each of said plurality of input cells additionally connected with a respective input pin of said controller; and
   a synchronizing signal generator connected with said synchronization control module and with said plurality of input cells,
   wherein each one of said plurality of input cells is operable to convert input signal parameters to time-based parameters; and wherein each of said signal acquisition modules is configured to convert said time-based parameters to a required digital form.

2. The configurable controller of claim 1, wherein each of said plurality of input cells comprises a comparator, said comparator adapted to receive an input signal from the respective input pin, and a synchronization signal from said synchronizing signal generator, and to output a signal.

3. The configurable controller of claim 2, wherein said synchronization signal has a saw-teeth shape.

4. The configurable controller of claim 1, wherein said configurable controller additionally comprises a plurality of configurable output control logic modules connected with said control logic, said controller additionally comprising a plurality of high-side and low-side output drivers connected with said configurable output control logic modules, said drivers additionally connected with a plurality of output pins of said controller.

5. The configurable controller of claim 4, wherein at least one of said configurable output control logic modules is connected to one pair of high-side driver and low-side driver, said drivers connected through respective output pins of said controller to one side of a load, wherein said configurable output control logic module is configured to drive only one of said high-side driver and low-side driver, depending on said load's other side connection.

6. The configurable controller of claim 4, wherein at least one of said configurable output control logic modules is connected to one of said low-side drivers or to one of said high-side drivers, said one driver connected through a respective output pin of said controller to a load, wherein said configurable output control logic module is configured to drive said one driver.

7. The configurable controller of claim 4, wherein a first and second ones of said configurable output control logic modules are connected respectively to one pair of high-side driver and low-side driver, said high-side driver and said low-side driver connected through two respective output pins of said controller to two sides of a load, wherein said first and second configurable output control logic modules are configured to control said pair of high-side driver and low-side driver by two independent signal sources.

8. The configurable controller of claim 4, wherein at least one of said configurable output control logic modules is connected to two of said high-side drivers, said two high-side drivers connected through respective output pins of said controller to one side of a load, wherein said configurable output control logic module is configured to simultaneously control said two high-side drivers.

9. The configurable controller of claim 4, wherein at least one of said high-side or low-side drivers is connected to one of said input cells.

10. The configurable controller of claim 9, wherein said input cell is operable to measure the current of said at least one high-side or low-side driver.

11. The configurable controller of claim 10, wherein said input cell is operable to detect connectivity of said at least one high-side or low-side driver.

12. The configurable controller of claim 10, wherein said input cell is operable to confirm switching of said at least one high-side or low-side driver.

13. A method of acquiring a plurality of signals, comprising the steps of:
   providing a synchronization control module;
   configuring a plurality of configurable signal acquisition modules connected with said synchronization control module;
   providing a control logic connected with said plurality of signal acquisition modules;
   providing a plurality of input cells respectively connected with said plurality of signal acquisition modules;
   providing a synchronizing signal generator connected with said synchronization control module and with said plurality of input cells, acquiring a plurality of input signals, each said signals acquired by one of said plurality of input cells;
   converting said acquired signal parameters into a plurality of time-based parameters; and
   converting said plurality of time-based parameters into required digital forms.

14. The method of claim 13, wherein said step of converting said acquired signal parameters into a plurality of time-based parameters comprises the steps of:
   receiving a synchronization signal from said synchronizing signal generator; and
   comparing said acquired input signal with said synchronization signal.

15. The method of claim 14, wherein said synchronization signal has a saw-teeth shape.

* * * * *